(12) United States Patent
Kubik et al.

(10) Patent No.: US 9,449,194 B2
(45) Date of Patent: *Sep. 20, 2016

(54) SECURE ACCESS TO RUNNING CLIENT APPLICATION FEATURES FROM A BROWSER APPLICATION

(71) Applicant: International Business Machines Corporation, Armonk, NY (US)

(72) Inventors: Joseph Kubik, Cary, NC (US); David M. Wendt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/608,268

(22) Filed: Jan. 29, 2015

(65) Prior Publication Data

US 2015/0379288 A1 Dec. 31, 2015

Related U.S. Application Data

(63) Continuation of application No. 14/314,231, filed on Jun. 25, 2014.

(51) Int. Cl.
| | |
|---|---|
| G06F 21/62 | (2013.01) |
| H04L 29/08 | (2006.01) |
| G06F 17/30 | (2006.01) |
| G06F 9/00 | (2006.01) |

(52) U.S. Cl.
CPC .............. *G06F 21/629* (2013.01); *G06F 9/00* (2013.01); *G06F 17/30368* (2013.01); *G06F 17/30864* (2013.01); *H04L 67/02* (2013.01)

(58) Field of Classification Search
CPC .............................. G06F 21/629; H04L 67/02
See application file for complete search history.

(56) References Cited

U.S. PATENT DOCUMENTS

| | | | |
|---|---|---|---|
| 5,892,905 | A | 4/1999 | Brandt et al. |
| 6,199,164 | B1 | 3/2001 | Nishimoto et al. |
| 2005/0278651 | A1 | 12/2005 | Coe et al. |
| 2011/0270666 | A1 | 11/2011 | Welsh et al. |

FOREIGN PATENT DOCUMENTS

| | | |
|---|---|---|
| EP | 2472422 A1 | 7/2012 |
| WO | 2013144929 A1 | 10/2013 |

OTHER PUBLICATIONS

IBM: List of IBM Patents or Patent Applications Treated As Related (Appendix P), dated Feb. 2, 2015.

(Continued)

*Primary Examiner* — Ellen Tran
(74) *Attorney, Agent, or Firm* — Patricia B. Feighan; Anthony England (57) ABSTRACT

A secure access is provided to a plurality of software application features associated with a plurality of software applications running on a user's device, wherein the secure access is provided from a web browser application associated with the user's device. This may include providing an open connection between a server and at least one software application within the plurality of software running on the user's device. This may also include sending a message from the web browser application to the server. This may further include detecting the sent message from the web browser application to the server. Additionally, the open connection may be used to send data from the server to the at least one software application.

5 Claims, 3 Drawing Sheets

(56) References Cited

OTHER PUBLICATIONS

Pending U.S. Appl. No. 14/314,231, filed Jun. 25, 2014, Entitled: "Secure Access to Running Client Application Features From a Browser Application".

Law, "Understanding Protocols," MSDN Blogs, Jul. 13, 2011, p. 1-6, IEInternals, http://blogs.msdn.com/b/ieinternals/archive/2011/07/14/url-protocols-application-protocols-and-asynchronous-pluggable-protocols-oh-my.aspx, Accessed on: May 5, 2014.

Lillerud et al., "Detect from browser if specific application is installed," Stack Overflow, Nov. 14, 2008, p. 1-2, http://stackoverflow.com/questions/291704/detect-from-browser-if-specific-application-is-installed, Accessed on: May 5, 2014.

Raj et al., "Detect windows client software installed on a client machine," Bytes IT Community, Jul. 23, 2005, p. 1-3, topics: javascript / ajax / dhtml, http://bytes.com/topic/javascript/answers/145239-detect-windows-client-software-installed-client-machine, Accessed on: May 5, 2014.

Tulipvn et al., "detect if an application has installed on the client machine from asp.net?," asp.net Forums, Jan. 10, 2012, p. 1-2, Advanced asp.net: Architecture, Microsoft by Neudesic, LLC., http://forums.asp.net/t/1757947.aspx, Accessed on: May 5, 2014.

SECURE ACCESS TO RUNNING CLIENT APPLICATION FEATURES FROM A BROWSER APPLICATION

FIELD OF THE INVENTION

The present invention relates generally to the field of computing, and more particularly to web applications.

BACKGROUND

Web applications run in browsers and have various security and resource limitations. Installed client applications generally have higher security access and less resource limitations. However, in some cases, web applications may require more access to the local system legitimately. For example, web applications may have limits on file uploads and downloads or the need to control such transactions in a recoverable way.

SUMMARY

According to one embodiment, a method is provided for a secure access to a plurality of software application features associated with a plurality of software applications running on a user's device, wherein the secure access is provided from a web browser application associated with the user's device. The method may include providing an open connection between a server and at least one software application within the plurality of software running on the user's device. The method may also include sending a message from the web browser application to the server. The method may further include detecting the sent message from the web browser application to the server. Additionally, the method may include utilizing the open connection to send data from the server to the at least one software application.

According to another embodiment, a computer system is provided for a secure access to a plurality of software application features associated with a plurality of software applications running on a user's device, wherein the secure access is provided from a web browser application associated with the user's device. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include providing an open connection between a server and at least one software application within the plurality of software running on the user's device. The method may also include sending a message from the web browser application to the server. The method may further include detecting the sent message from the web browser application to the server. Additionally, the method may include utilizing the open connection to send data from the server to the at least one software application.

According to yet another embodiment, a computer program product is provided for a secure access to a plurality of software application features associated with a plurality of software applications running on a user's device, wherein the secure access is provided from a web browser application associated with the user's device. The computer program product may include one or more computer-readable tangible storage medium and program instructions stored on at least one of the one or more tangible storage medium, the program instructions executable by a processor. The computer program product may include program instructions to provide an open connection between a server and at least one software application within the plurality of software running on the user's device. The computer program product may also include program instructions to send a message from the web browser application to the server. The computer program product may further include program instructions to detect the sent message from the web browser application to the server. Additionally, the computer program product may include program instructions to utilize the open connection to send data from the server to the at least one software application.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to web applications. The following described exemplary embodiments provide a system, method and program product to, among other things, provide secure access to running client application features from a web browser application.

As previously described, web applications may run in browsers, such as Firefox® (Firefox and all Firefox-based trademarks and logos are trademarks or registered trademarks of Mozilla and/or its affiliates). Such web applications may have various security and resource limitations. Installed client applications generally have higher security access and less resource limitations. However, in some cases, web applications may require more access to the local system legitimately. For example, web applications may have limits on file uploads and downloads or the need to control such transactions in a recoverable way.

In cases where a client application (e.g., an email application or an instant messaging application) is available that can perform 'advanced' functions of the web application equivalent, it may be convenient if the web application could invoke a feature on the client application in a secure way on its behalf. Currently, there are two approaches to solving this issue: custom URI handlers and an open local port monitored by the running client application. The custom URI handler is a mechanism where a specific protocol is registered and used by the browser to launch a client program, such as 'notes—Lotus Notes' . As such, this customer URI handler may be used in the browser as a launch page, such as:

window.location="Notes://D03NM120/
        8525602A005EE6/
        38D46BF5E8852564B500129B2C/
        20FF382A02D8625 7BD4004E7FF6"

Therefore, the above link may launch the Lotus Notes application on a system and open a specific document. Everything after the Notes:// protocol is interpreted by the custom handler—in this case the local Lotus Notes application. However, a security risk associated with such a Custom URI handler may exist since any web application may potentially use this protocol to launch any registered application on a user's desktop. Therefore, in some instances, a web browser may warn users about such a launch and allow the user to abort it.

For example, when at a certain website a user may be prompted with a pop-up window requesting the user to 'ALLOW' the website to open a program on the computer. Such a pop-up window prompt may have the 'always-do-this-from-now-on' checkbox. It may be important to note that the security involved is not with respect to the trust associated with the custom handler, but rather regarding the trust associated with the website that invokes the handler. Nevertheless, selecting this box does not merely allow the one certain website to start the program. Rather, once this box is selected, any web page that the user may visit anywhere on the internet may start that program on the user's desktop. As such, a user-experience that the user may not be able to control may exist, since the browser pop-up message cannot be customized. As a result, by allowing such programs to automatically launch, the user may create a potential security hole since any web page may now launch applications on the user's desktop.

Another approach may be to have the client application monitor an open port for the web-user interface to contact. However, since web applications are capable of only performing HTTP, a custom socket transport may not possible. Therefore, the client application may become a mini HTTP server which may be feasible regarding plain HTTP since APIs exist that may efficiently assist with such an implementation. However, an issue exists regarding how to secure the connection between the web application running in the web browser and the client application. As previously discussed, any web page may send requests to an open local host port. As such, the only real option in this instance may be to use HTTPS along with client authentication. Therefore, any custom security protocols through plain HTTP may easily be deciphered using a network sniffer and browser web page debuggers. Therefore, supporting HTTPS on the mini HTTP client may require a trusted certificate be installed on every client which may become difficult and expensive to manage, especially if a unique certificate is used for both authentication and securing the traffic.

Additionally, another possible approach may be to use a browser plugin or extension to communicate to the client application. This may be no different than making the client application a web browser plugin itself. However, plugins generally have restrictions controlled by the user and may warn users or require an extra step to enable their use on the web user interface. As such, it may be advantageous, among other things, to provide a secure access to running client application features from a web browser application.

According to at least one embodiment herein disclosed, an option may be introduced that may not require a custom URI handler or an open port (i.e., channel or connection) on the client. Existing web connections and client connections may be used to ensure the client application feature may be invoked securely and effectively. As such, the present embodiment may require a client application to be running and an open connection or channel with the server may exist. Such an open connection is often referred to as a longpoll' where the request has already been verified and secured with SSL and the server simply does not respond until data is available for the client. However, if the connection is cut or times-out, the client usually restarts the request immediately which is a known protocol (referred to as COMET) in existing technology. COMET is a web model in which a long-held HTTP request allows a web server to push data to a web browser, without the web browser explicitly requesting it.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide secure access to running client application features from a web browser application. According to at least one implementation, an open channel may be used by the server whenever data may need to be pushed to the client. The present embodiment may utilize an open channel to allow a web application (which may also be authenticated and secured with SSL) to send a request to the client application through the server. As such, the server may match the request to the appropriate open channel and thereby, push the request to the client.

According to one implementation, a user's operating system may be running a client application, such as an email application or an instant messaging application in the background as a system-tray process on the user's device. Then, a local client application may open a connection with a server and the channel is left open (e.g., Longpoll). The active channel with the client application may be registered in the server database. The device running the web application in the browser may require a client application function (e.g., large upload/download). Therefore, the web application request may check for an active client in the registered database. Then, the web application request may be routed through the server and the server may forward the request to the user's client application. The registered client application entry may be used to map the request to an appropriate open channel and then, the request may be sent to the client through the open channel.

Figure 1:
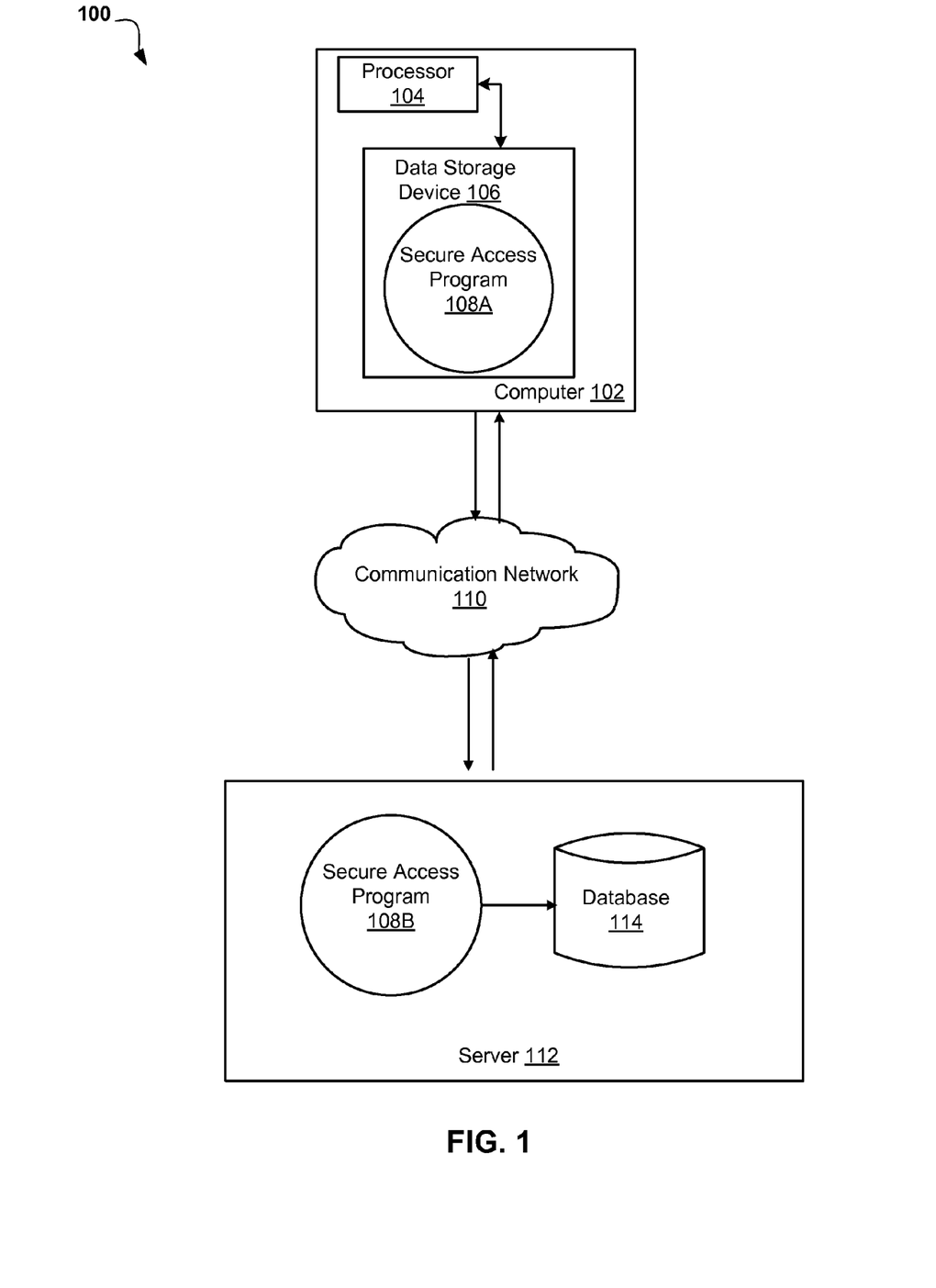
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a Secure Access Program 108A. The networked computer environment 100 may also include a server 112 with a database 114. The server 112 may be enabled to run a Secure Access Program 108B. The networked computer environment 100 may also include a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a Secure Access Program 108A and 108B may run on the client computer 102 or on the server computer 112. The Secure Access Program 108A, 108B may provide secure access to running client application features from a web browser application, such as Firefox® (Firefox and all Firefox-based trademarks and logos are trademarks or registered trademarks of Mozilla and/or its affiliates). According to one implementation, a user may be using a computer, such as computer 102. The operating system for computer 102 may be running a client application, such as en email application or an instant messaging application in the background as a system-tray process on the user's device (i.e., computer 102). Then, the local client application may open a connection with a server and the channel is left open (i.e., Longpoll). Next, the active channel with the client application (e.g., the email application or the instant messaging application) may be registered by the Secure Access Program 108A, 108B in the database 114 running on server 112. For example purposes, the computer 102 running a web application in the browser (e.g., Firefox® (Firefox and all Firefox-based trademarks and logos are trademarks or registered trademarks of Mozilla and/or its affiliates)) may require a client application function (e.g., large upload/download). Next, the Secure Access Program 108A and 108B (based on the web application request) may check for an active client in the registered database 114. Then, the web application request may be routed through the server 112 by the Secure Access Program 108A, 108B and the server 112 may forward the request to the user's client application (e.g., the email application or the instant messaging application) running on computer 102. According to the present embodiment, the registered client application entry may be used by the Secure Access Program 108A, 108B to map the request to an appropriate open channel. Then, the request may be sent by the Secure Access Program 108A, 108B to the client through the open channel. The Secure Access method is explained in further detail below with respect to FIG. 2.

Figure 2:
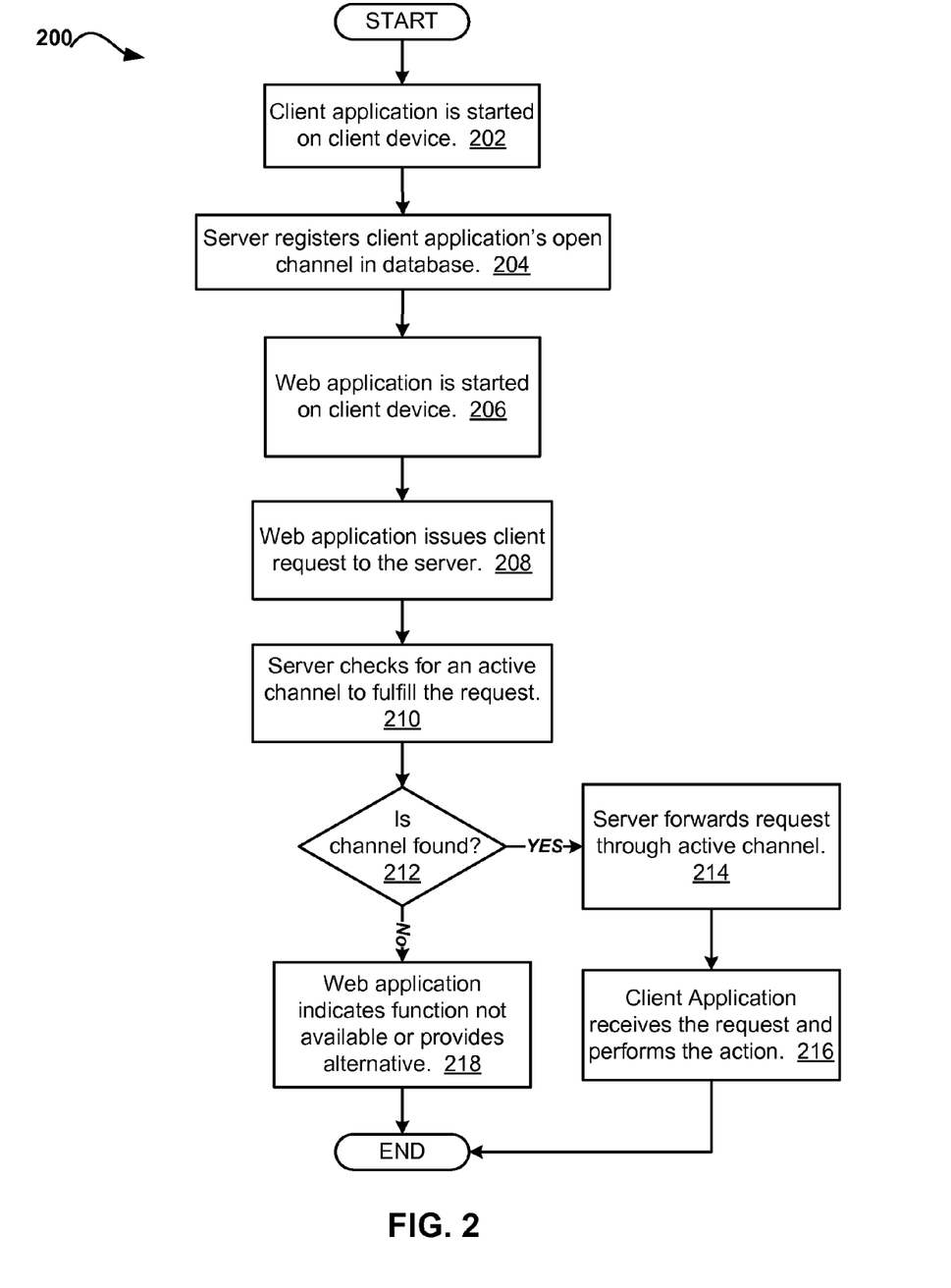
FIG. 2 is an operational flowchart illustrating the steps carried out by a program to provide secure access to running client application features from a browser application according to at least one embodiment.

FIG. 2, an operational flowchart 200 illustrating the steps carried out by a program to provide secure access to running client application features from a browser application in accordance with one embodiment is depicted. According to the present embodiment, the Secure Access Program 108A, 108B (FIG. 1) may automatically run and an open channel may be used by the server 112 (FIG. 1) whenever data may need to be pushed to the client (i.e., computer 102 (FIG. 1)). The present embodiment may utilize an open channel to allow a web application, which may also be authenticated and secured with SSL, to send a request to the client application on computer 102 (FIG. 1) through the server 112 (FIG. 1) As such, the server 112 (FIG., 1) may match the request to the appropriate open channel and thereby, push the request to the client on computer 102 (FIG. 1).

Referring now to FIG. 2 at 202, a client application may be started on a client device. For example, an email application or an instant messaging application may be started on a user's device, such as computer 102 (FIG. 1). As a result, the local client application may open a connection with the server, such as server 112 (FIG. 1) and the channel may be left open (i.e., longpoll).

Then at 204, the server may register the client application's open channel in a database running on the server. As such, the active channel, along with the client application (e.g., email application or instant messaging application) may be registered as an entry in a database, such as database 114 (FIG. 1) on the server (e.g., server 112 (FIG. 1). Therefore, according to one implementation, the entry in the database 114 (FIG. 1) may be a line in the database 114 (FIG. 1) explaining the client application name and what action(s) the client application has the authority to perform with respect to web browser requests.

Next at 206, the web application may be started on the client device. For example, a web application running in a web browser, such as Firefox® (Firefox and all Firefox-based trademarks and logos are trademarks or registered trademarks of Mozilla and/or its affiliates) on the user's computer 102 (FIG. 1) may require a client application function (e.g., a large upload or a large download).

Then at 208, the web application may issue the client request to the server. Therefore, with respect to the above example, the large upload or the large download request may be sent from the web application (the email program or the instant messaging program in the above example) to the server 112 (FIG. 1). As such, the web application request may be routed through the server 112 (FIG. 1).

Next at 210, the server may check for an active channel to fulfill the request. Therefore, based on the web application request, the server 112 (FIG. 1) may check the database 114 (FIG. 1) running on server 112 (FIG. 1) for an active client registered in the database 114 (FIG. 1). As such, the Secure Access Program 108A, 108B (FIG. 1) may use the registered client application entry (from previous step 204) to map the request (from previous step 208) to an appropriate open channel.

Then at 212, it is determined whether a channel is found. If at 212 it is determined that a channel is found (based on the mapping performed in the previous step 210), then at 214, the server may forward the request through the active channel. As such, the request may be sent to the client using computer 102 (FIG. 1), for example, through the open channel. Next, at 216, the client application may receive the request and perform the action. As such, since there are no known security issues with respect to the request, the requested action may automatically be performed by the client application (e.g., the email application or the instant messaging application) on the client's device, such as computer 102 (FIG. 1).

However, if at 212 it is determined that a channel is not found, then at 218, the web application may indicate the function is not available or the web application may provide an alternative, such as a default pop-up window requiring a user response with respect to the security of the requested action.

It may be appreciated that FIG. 2 provides only an illustration of one implementation and does not imply any limitations with regard to how different embodiments may be implemented. Many modifications to the depicted environments may be made based on design and implementation requirements.

Figure 3:
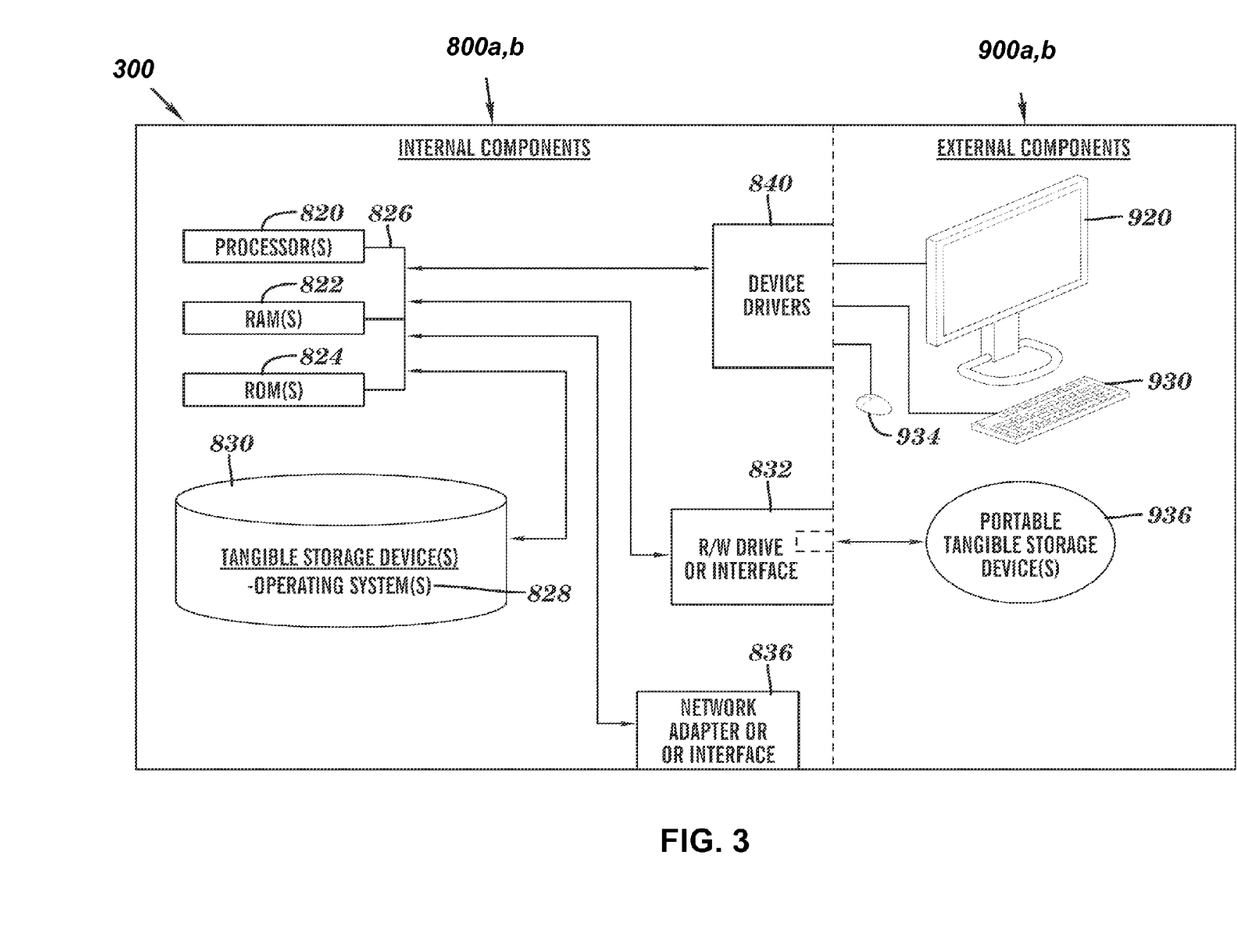
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Secure Access Program 108A (FIG. 1) in client computer 102 (FIG. 1) and Secure Access Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Secure Access Program 108A (FIGS. 1) and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The Secure Access Program 108A (FIG. 1) in client computer 102 (FIG. 1) and the Secure Access Program m 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Secure Access Program 108A (FIG. 1) in client computer 102 (FIG. 1) and the Secure Access Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to provide a secure access to a plurality of software application features associated with a plurality of software applications running on a user's device, wherein the secure access is provided from a web browser application associated with the user's device, the method comprising:

in response to a local client application within a plurality of software applications running on a user's device being started, registering the started local client application within the plurality of software applications running on the user's device as an entry in a database on the server, wherein the entry in the database comprises the registered started local application name along with a plurality of actions that the registered started local application has authority to perform regarding web browser requests;

querying the database on the server by the web browser application to fulfill a request to enable utilization of the registered local client application;

mapping the request to an appropriate open channel in response to the querying of the database on the server providing an active channel that is enabled to fulfill the request;

in response to the querying of the database on the server not providing an active channel that is enabled to fulfill the request, providing a notification indicating the request cannot be fulfilled, wherein the provided notification comprises displaying a pop-up window prompting a user response regarding security associated with the request to enable utilization of the registered local client application;

providing an open connection between the server and at least one software application within the plurality of software running on the user's device based on the mapped request;

providing an open connection between the server and at least one software application within the plurality of software running on the user's device based on the user response regarding the security associated with the request to enable utilization of the registered local client application;

sending a message from the web browser application to the server;

detecting the sent message from the web browser application to the server; and utilizing the open connection to send data from the server to the at least one software application.

2. The method of claim 1, wherein the open connection comprises a use of existing technology.

3. The method of claim 1, wherein the open connection is a secure connection.

4. The method of claim 1, wherein the open connection is registered in a database on the server.

5. The method of claim 1, wherein the providing an open connection between a server and at least one software application within the plurality of software running on the user's device comprises the server checking for an active channel to fulfill a request from the web browser application and the server using the registered client application entry to map the request to an appropriate open channel.

* * * * *